United States Patent [19]
Badger et al.

[11] Patent Number: 5,923,616
[45] Date of Patent: Jul. 13, 1999

[54] COMMUNICATION COIL HOUSING FOR A SOLID MARINE SEISMIC CABLE

[75] Inventors: Algernon S. Badger, East Bernard; Win H. Chang, Houston; Richard H. Luce, Katy; Hoan P. Nguyen, Houston; Christopher A. Neighbors, Alvin, all of Tex.

[73] Assignee: Input/Output, Inc., Stafford, Tex.

[21] Appl. No.: 08/873,120

[22] Filed: Jun. 11, 1997

Related U.S. Application Data

[63] Continuation-in-part of application No. 08/784,978, Jan. 17, 1997, Pat. No. 5,781,510.

[51] Int. Cl.$^6$ .................................................... G01V 1/38
[52] U.S. Cl. .............................. 367/16; 367/17; 367/154
[58] Field of Search ............................ 367/16, 17, 154; 114/245

[56] References Cited

U.S. PATENT DOCUMENTS

| | | | |
|---|---|---|---|
| 3,648,642 | 3/1972 | Fetrow et al. | 114/235 B |
| 3,675,193 | 7/1972 | Davis | 367/15 |
| 3,680,520 | 8/1972 | Smith | 114/235 B |
| 3,704,681 | 12/1972 | Campbell et al. | 114/235 B |
| 4,222,340 | 9/1980 | Cole | 114/245 |
| 4,290,124 | 9/1981 | Cole | 367/18 |
| 4,611,171 | 9/1986 | Woods | 324/253 |
| 4,671,120 | 6/1987 | Fowler | 73/291 |
| 4,709,355 | 11/1987 | Woods et al. | 367/16 |
| 4,711,194 | 12/1987 | Fowler | 367/17 |
| 4,912,684 | 3/1990 | Fowler | 367/76 |
| 5,200,930 | 4/1993 | Rouquette | 367/76 |
| 5,507,243 | 4/1996 | Williams, Jr. et al. | 367/154 |

*Primary Examiner*—Ian J. Lobo
*Attorney, Agent, or Firm*—Haynes and Boone, L.L.P.; Tim Headley

[57] ABSTRACT

A solid marine seismic cable assembly includes communication coil housings which clamp around a cable in a spaced-apart relationship. The cable has a central axis. Each housing contains at least two communication coils adapted for communicating with an adjacent external device. Two of the communication coils, whether or not adjacent to one another, are offset at least 90° from each other about the axis of the cable. The external devices affix to the cable assembly in a spaced-apart relationship corresponding to the spaced-apart relationship of the communication coil housings. Each external device has a unit which communicates with the communication coil via magnetic induction signals.

18 Claims, 7 Drawing Sheets ns, commonly known in the
COMMUNICATION COIL HOUSING FOR A SOLID MARINE SEISMIC CABLE This patent application is a continuation-in-part of U.S. Pat. No. 5,781,510, entitled "Hydrophone Housing For a Solid Marine Seismic Cable", filed Jan. 17, 1997, the contents of which are incorporated here by reference.

BACKGROUND OF THE INVENTION

This invention relates to marine seismic cables, and, more particularly, to a towed seismic cable which flexible solid materials, disposed within the cable, buoyantly support.

For many years, the marine seismic exploration industry has relied on fluid-filled seismic cables. Marine seismic cables are one of the most critical components used with seismic exploration vessels, and have a direct affect on the accuracy of the results which researchers and technicians obtain. The amount and type of fluid in oil-filled cables must be adjusted dependent on changes in water temperature and/or salinity. Also, oil-filled cables are prone to leakage. The outer jacket of the seismic cables of the prior art is prone to rupture or tearing. This is particularly undesirable because this exposes the internal electrical components to seawater, and disrupts the buoyancy of the cable.

The prior art has used communication coils to communicate with various external devices, such as cable-levelers. A cable-leveler attaches to the outside of the cable in order to control the depth of the cable, according to magnetic induction signals which the cable-leveler receives from the communication coil inside the cable. Other external devices such as location modules, compasses, and depth transducers may also use the communication coil for telemetry. This wireless communication system, commonly known in the art, eliminates the need for a physical connection between the communication coil inside the cable and the external device, thus better ensuring water-tight enclosure of the cable. The prior art wireless communication system used with a kerosene-filled cable, or non-solid cable, includes a single coil that is attached with plastic "ties" to the bundles of wires which make up a center core of such cable.

U.S. Pat. Nos. 5,089,668, 5,141,796, and 5,471,436 disclose the use of a buoyant material to permit solid or semi-solid composition of a seismic cable. There is no way to attach the existing communication coil to the center core of a solid cable without the center core, and its attached communication coil, moving with respect to the external device. A center core occupies the center of a solid cable. The center core includes a rope centered within electrical cables, all within a sheath. Therefore, the communication coil must be placed adjacent to the center core. The communication path between the communication coil and a receiver or a transmitter in the external device is a straight line. If the cable twists in the water so that the center core obstructs all or part of the communication path, then the magnetic induction between the external device and the communication coil is disrupted or broken, both by distance and by the shielding caused by the center core. This has an adverse effect on the ability of the communication coil to communicate with the receiver or transmitter in the external device.

The industry needs a solid seismic cable which enables attachment of external devices to the cable without concern for the radial alignment of the device with a communication coil inside the cable.

SUMMARY OF THE INVENTION

The present invention solves the foregoing problems, and achieves technical advances, with a solid marine seismic cable assembly and a method of manufacturing the same, the cable assembly including communication coil housings which clamp around a cable in a spaced-apart relationship. Each housing contains at least two communication coils adapted for communicating with an adjacent external device.

In another feature of the invention, the communication coil housing provides an unobstructed communication path between a communication coil and a unit in an adjacent external device.

In another feature of the invention, the external devices affix to the cable assembly in a spaced-apart relationship corresponding to the spaced-apart relationship of the communication coil housings. Each external device has a unit which communicates with the communication coils via magnetic induction signals.

In another feature of the invention, the cable includes a load-bearing fiber bundle, signal-transmitting wires, and power conductors.

In another feature of the invention, a buoyant filler surrounds the cable and separates the communication coil housings, and an outer protective jacket surrounds the communication coil housings and the buoyant filler.

In another feature of the invention, the cable assembly maintains buoyancy even when the protective jacket ruptures.

DETAILED DESCRIPTION OF THE PREFERRED EMBODIMENT

Figure 1:
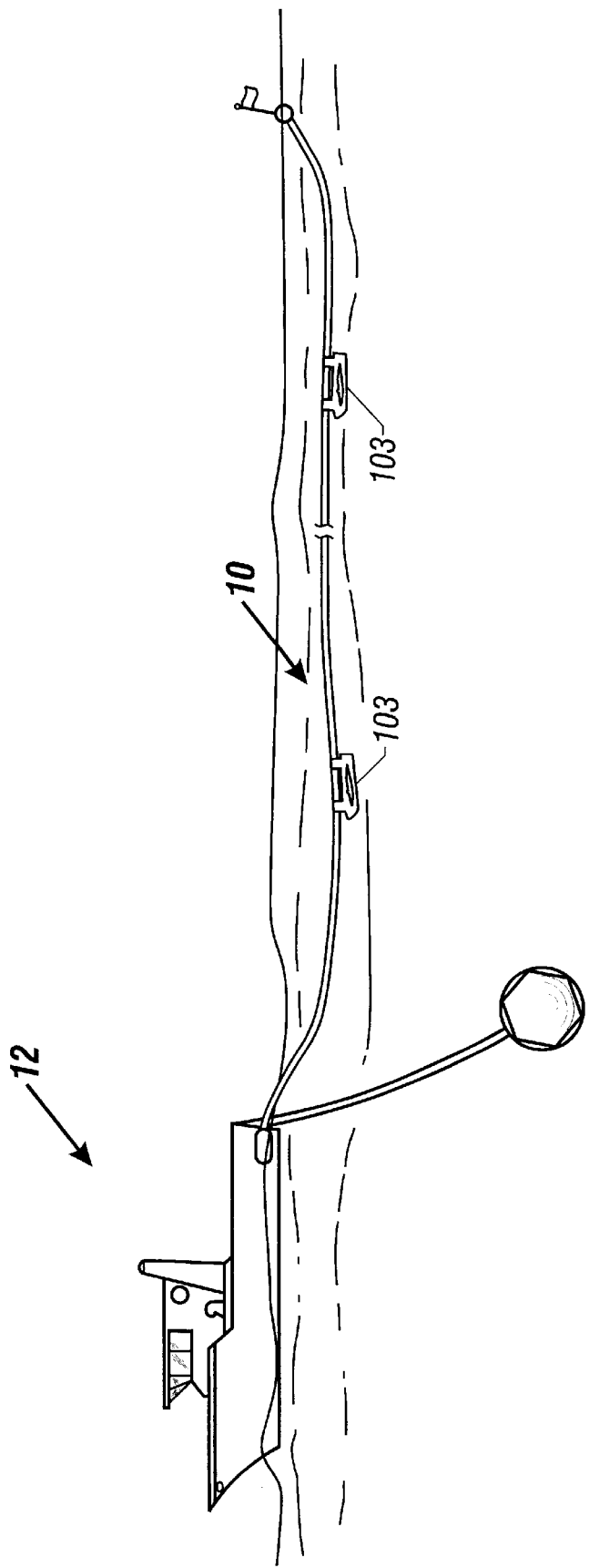
FIG. 1 is a general overall view of an illustrative seismic cable assembly towed behind a boat, the assembly containing many communication coils.

Referring to FIG. 1, a boat 12 tows a solid marine seismic cable assembly 10. The cable assembly 10 contains communication coils 14 (shown in FIG. 6).

Figure 2A:
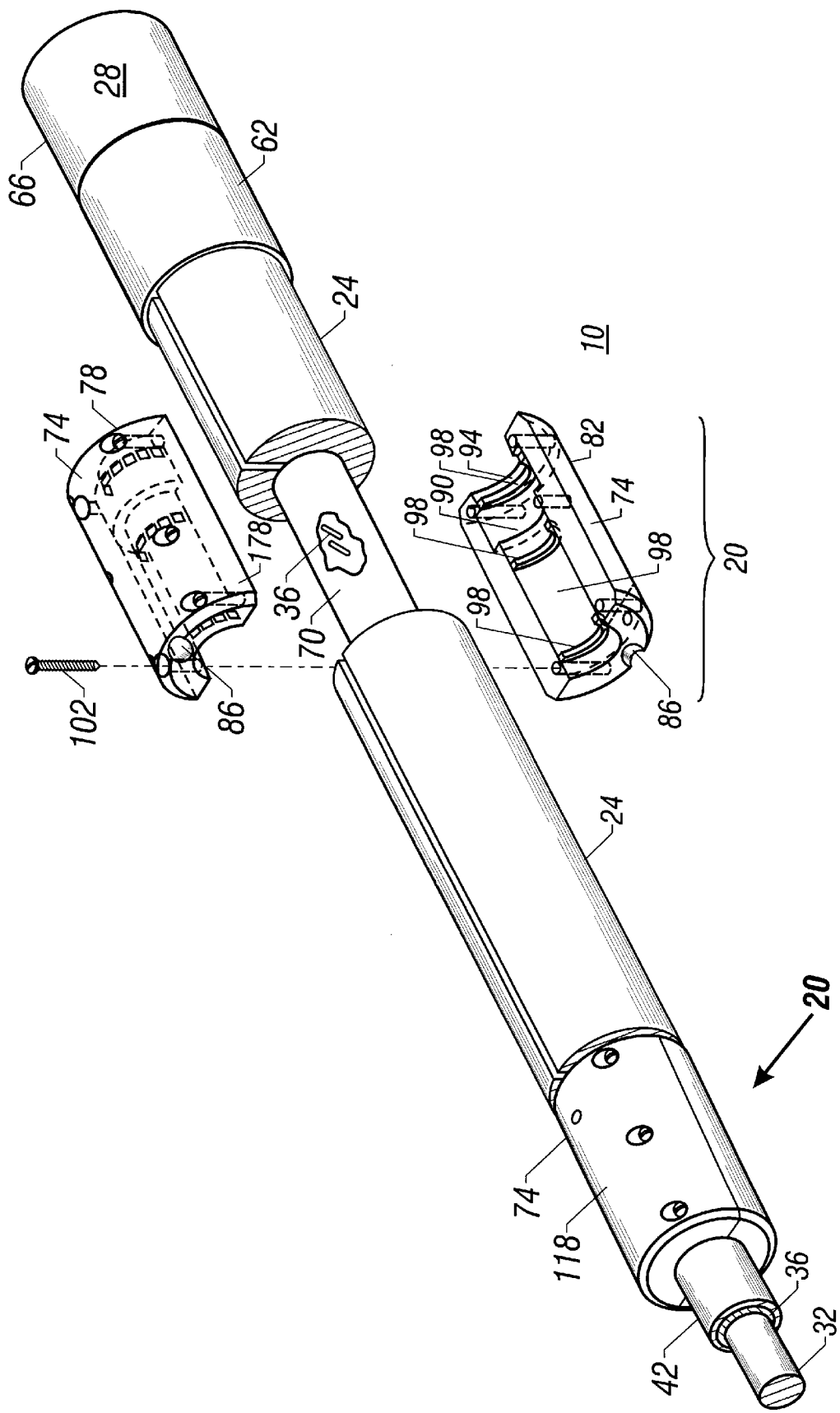
FIG. 2a is an exploded view of the preferred embodiment of the solid marine seismic cable assembly.

Referring to FIG. 2a, the cable assembly 10 includes a cable 16, communication coil housings 20, a buoyant filler 24, and an outer protective jacket 28. The cable 16 includes a load-bearing fiber bundle 32, signal-transmitting wires 36, power conductors 38 (shown in FIG. 4), and optical fibers 40 (shown in FIG. 4) encased in stainless steel tubes, and a clear, protective sheath 42. The optical fibers 40 transmit telemetry data.

Figure 3:
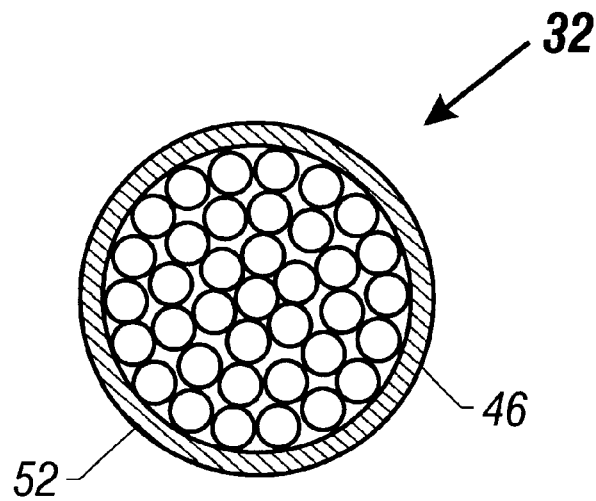
FIG. 3 is a cross-sectional view of the load-bearing fiber bundle of the preferred embodiment.
Figure 4:
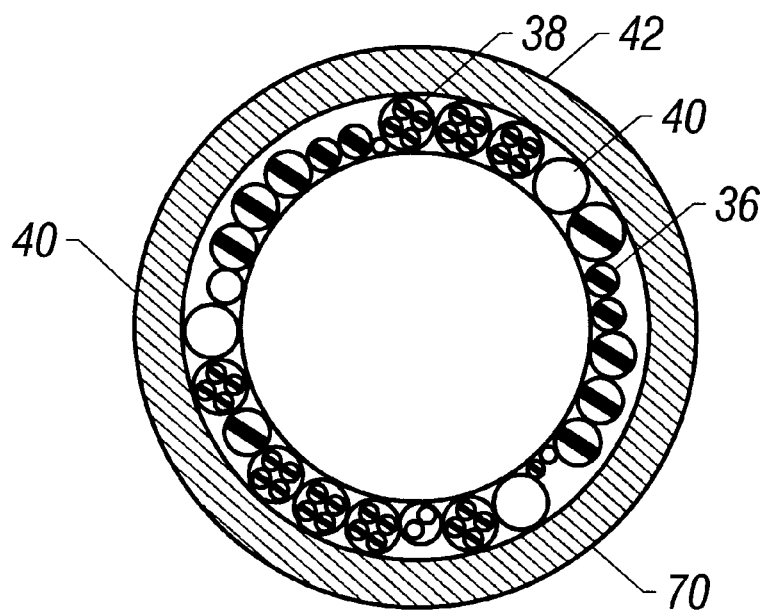
FIG. 4 is a cross-sectional view of the cable of the preferred embodiment.

Referring to FIGS. 3 and 4, the load-bearing fiber bundle 32 includes a thin cover 46 enclosing a counter-helixwrapped high-strength fiber 52. The cover 46 protects the fiber 52 from abrasion by the signal-transmitting wires 36, power conductors 38, and optical fibers 40. The fiber 52 is "KEVLAR 29", available from E.I. Du Pont, located in Wilmington, Del. The signal-transmitting wires 36, power conductors 38, and optical fibers 40 surround the load-bearing fiber bundle 32. The protective sheath 42 surrounds the assembly of these four items.

Figure 6:
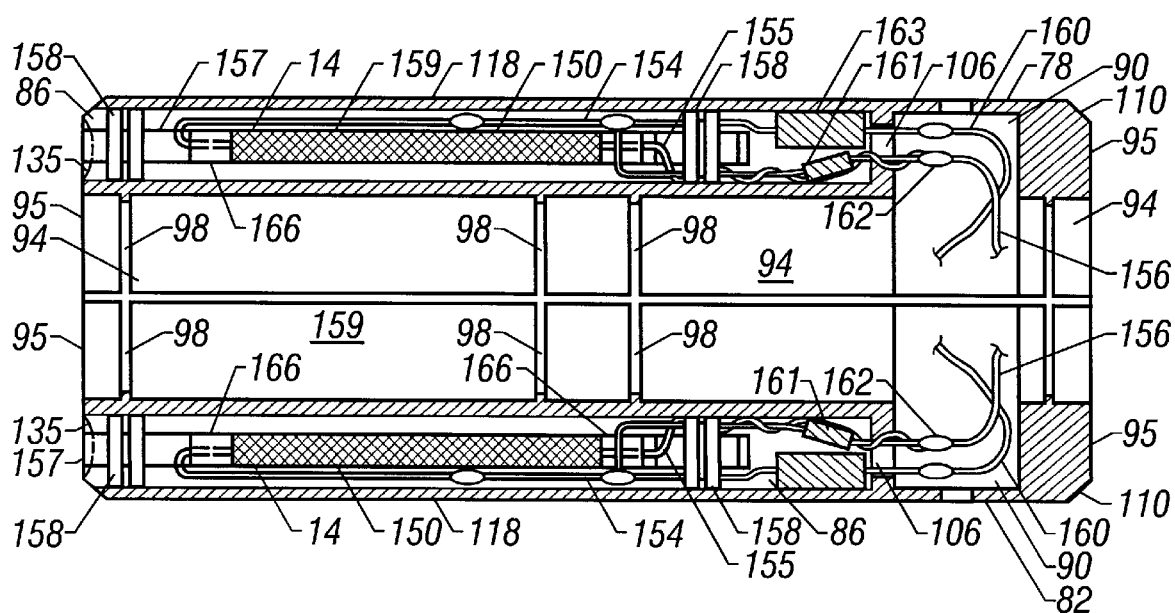
FIG. 6 is a cross-sectional view of a communication coil housing of the preferred embodiment.

Referring again to FIG. 2a, the communication coil housings 20 clamp around the cable 16, in a spaced-apart relationship. Each communication coil housing 20 includes at least two communication coil assemblies 150 (as shown in FIG. 6). The buoyant filler 24 surrounds the cable 16 between the communication coil housings 20.

The outer protective jacket 28 surrounds the communication coil housings 20 and the buoyant filler 24. The protective jacket 28 is a composite jacket having an internal layer 62 of polyurethane and an external layer 66 of polyvinyl chloride. The protective jacket 28 is available from Bayland Corporation of Manvel, Tex., in a co-extruded form. The protective jacket 28 seals the cable assembly 10 from water.

The buoyant filler 24 is a split tube which is a composite mixture of thermoplastic elastomer and glass microspheres, the composite mixture having a specific gravity of from 0.76 to 0.82. The elastomer is "VISTA-FLEX", Part No. 9601-74, available from Advanced Elastomers, Inc. of Akron, Ohio. The glass microspheres are "SCOTCHLITE" brand, Part No. B38/4000, available from 3M Corporation of St. Paul, Minn. The buoyant filler 24 substantially fills regions being bounded by an outermost cylindrical surface 70 of the cable 16 and an imaginary cylindrical surface, which extends between outermost cylindrical surfaces 74 of adjacent communication coil housings 20. An adhesive (not shown) applied along a split in the split tube bonds the buoyant filler 24 around the cable 16.

Each communication coil housing 20 further includes a top portion or top mount 78 and a bottom portion or bottom mount 82. Each mount 78 and 82 has a wire-clearance recess 90 and a receiving bore 86. The mounts 78 and 82 each include a contact surface 94 which contacts the cable 16 when the mounts fasten around the cable. The contact surfaces 94 include raised ribs or bosses 98 (most clearly shown in FIG. 6). The mounts 78 and 82 clamp around the cable 16 via screws 102. The bosses 98 securely grip the cable 16 by increasing contact pressure per unit area between the bosses and the cable.

The communication coil housing 20 is fabricated from a high strength, light weight, rigid, injection-moldable, composite polymer of about 40% by weight glass fiber fill in a polyurethane resin. Suitable polymers include "ISOPLAST", Part. No. 800-441-4DOW, available from DOW Chemical Company of Midland, Mich., or "ESTALOC", available from B.F. Goodrich Corporation of Jacksonville, Fla.

Figure 2B:
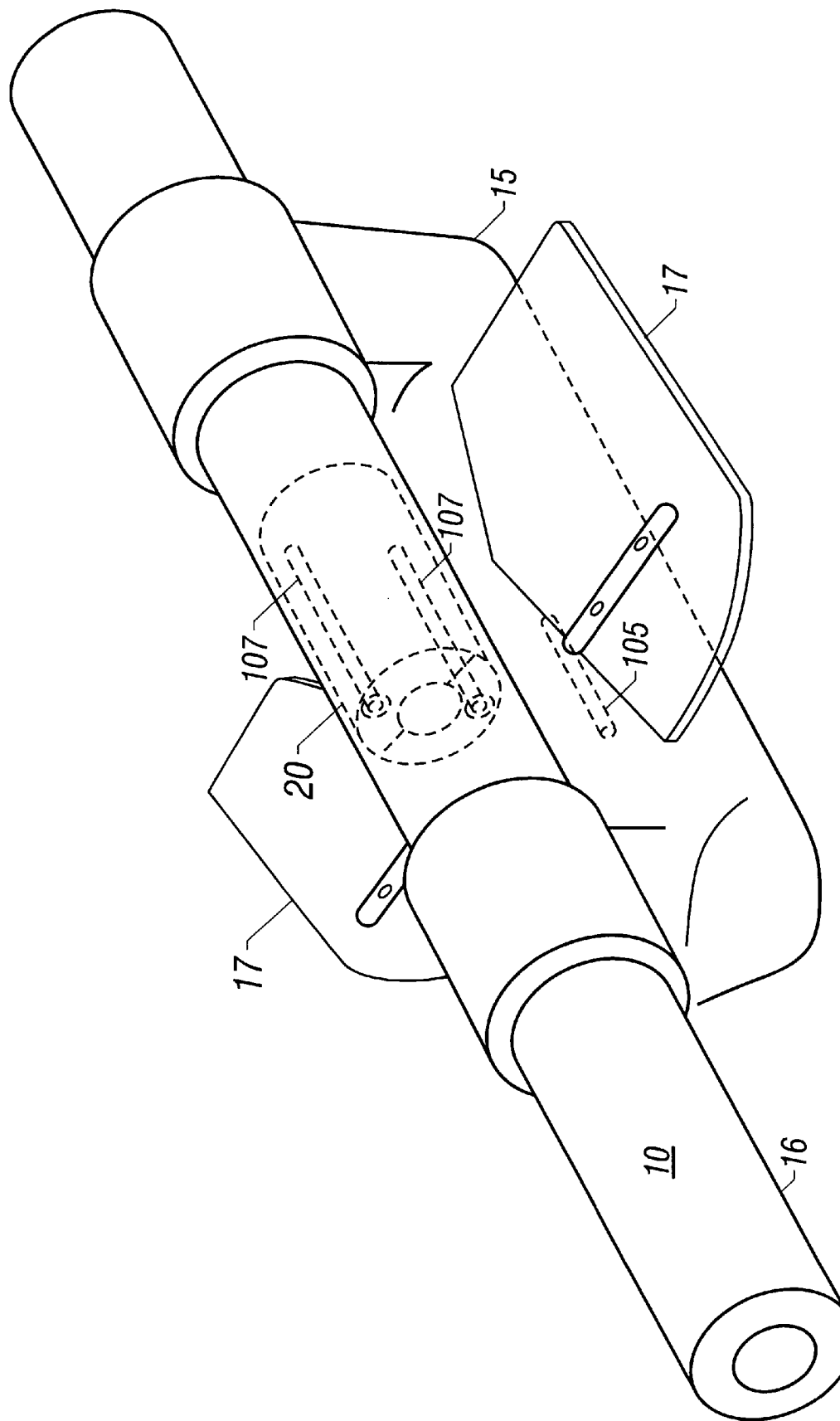
FIG. 2b is a perspective view showing the relationship of the preferred embodiment to an external device.

Referring to FIG. 2b, each communication coil housing 20 mounts in a spaced apart relationship (shown in FIG. 2a) adjacent to an external device such as a cable-leveler 15. The cable-leveler 15 includes a unit 105 which communicates with the communication coils 14 via magnetic induction signals. The cable-leveler 15 includes wings 17 which control the level of the cable assembly 10.

Figure 5:
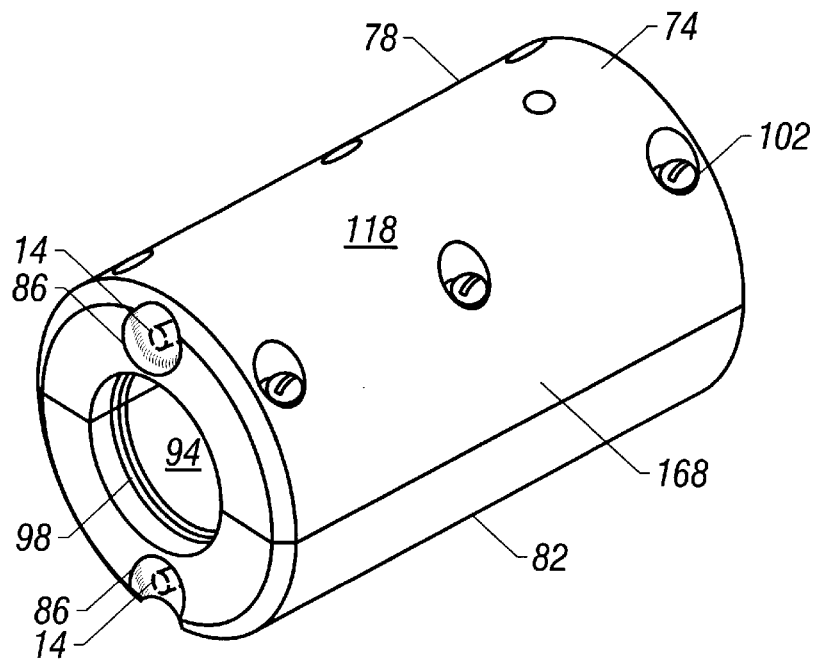
FIG. 5 is a perspective view of a communication coil housing of the preferred embodiment.

Referring to FIG. 5, when the mounts 78 and 82 clamp together, each communication coil 14 is offset about 180° from the adjacent communication coil. In an alternate embodiment, a communication coil housing may have more than two communication coils 14 disposed beneath its circumference. Whenever two or more communication coils 14 are used, two of the communication coils, whether or not adjacent to one another, must be offset at least 90° from each other in order to ensure an unobstructed communication path between at least one of the communication coils and the unit 105 (as shown in FIG. 2b) in the cable-leveler 15 (as shown in FIG. 2b). However, in order to ensure the unobstructed path, it is not necessary that the two communication coils 14 which are offset at least 90° be adjacent to each other.

Referring to FIG. 6, the mounts 78 and 82 each include a wire passageway 106 between the receiving bore 86 and the wire-clearance recess 90. A communication coil assembly 150 installs in the receiving bore 86. The communication coil assembly 150 includes a communication coil 14, lead wires 154 and 155, a resistor 161, a capacitor 163, lead wires 156 and 160, and two insulation grommets 158. The communication coil 14 is a ferrite rod 157 wound with an insulated copper wire 159. The ferrite rod 157 is part no. RXH-187-4000, available from National Magnetics of Bethlehem, Pa. The insulated wire 159 is part no. 39 AWG, available from MWS Wire Industries of Westlake, Calif. The resistor 161 is a 15 K-ohm, 1/10 W resistor, part no. CMF-50, available from Dale Electronics, Inc. of Norfolk, Nebr. The capacitor 163 is a 0.15 $\mu$F, 200 VDC capacitor. The insulation grommets 158 are available from Minor Rubber Company of Carrolton, Tex. The communication coil 14 mounts in the insulation grommets 158. The insulation grommets 158 center the communication coil 14 within the receiving bore 86.

Figure 7:
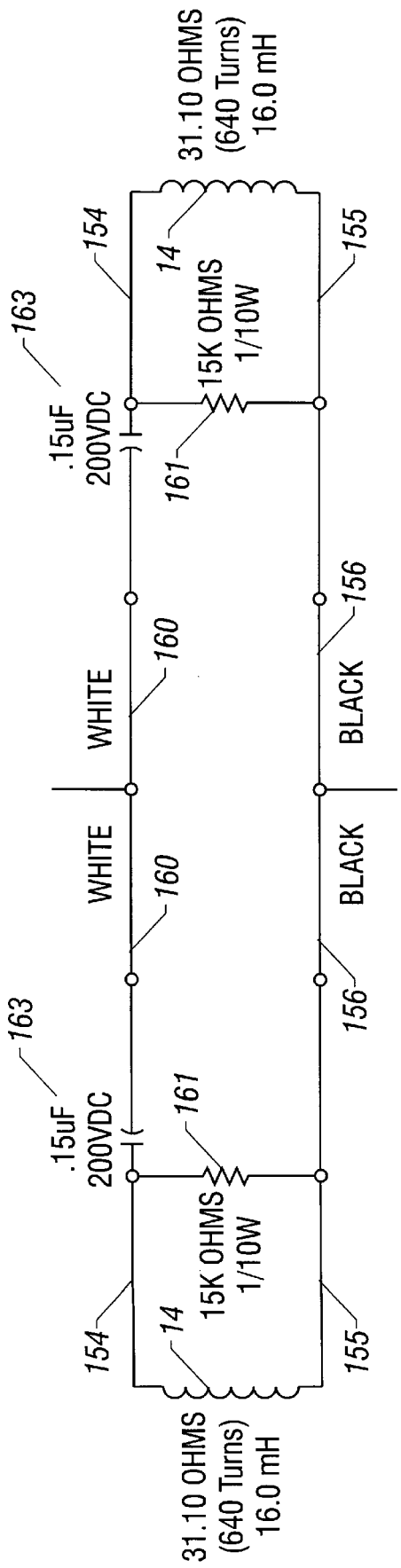
FIG. 7 is a wiring diagram for the communication coil housing of the preferred embodiment.

Referring now to FIGS. 6 and 7, lead wires 154 and 155 each have first and second ends. The first ends of lead wires 154 and 155 electrically connect to opposite ends of the communication coil 14. The second end of the lead wire 154 electrically connects to a first end of the resistor 161 and a first end of the capacitor 163. The second end of the lead wire 155 electrically connects to a second end of the resistor 161, the second end of the resistor 161 and a second end of the capacitor 163 each electrically connect to lead wires 156 and 160, respectively, via splices 162. The lead wires 156 and 160 each electrically connect to a respective signal-transmitting wire 36 in the cable 16. The wire-clearance recess 90 contains the splices 162. Strips of tape 166 secure the wires 154 and 155 to the communication coil 14.

The communication coil 14 is potted in the receiving bore 86 with a potting compound 135. The preferred potting compound is a urethane compound. The potting compound 135 fills substantially all the space in the receiving bore 86 not occupied by the communication coil assembly 150.

Referring again to FIGS. 2a and 4, a method of making the marine seismic cable 10 includes the following steps: surrounding the load-bearing fiber bundle 32 with signal-transmitting wires 36, power conductors 38, and optical fibers 40; enclosing the load-bearing fiber bundle 32, the signal-transmitting wires 36, the power conductors 38, and the optical fibers 40 with the protective sheath 42; electrically connecting the communication coil assembly 150 (shown in FIG. 6) in each communication coil housing 20 to the appropriate signal-transmitting wires 36, via splices 162; clamping communication coil housings 20 along the cable 16; installing the tubular, buoyant filler 24 between the communication coil housings 20 and around the cable 16; and enclosing the cable 16, the communication coil housings 20, and the buoyant filler 24 with the protective jacket 28.

Referring again to FIG. 6, a method of making the communication coil mount 78 or 82 for the cable assembly 10 includes the following steps: forming a block 110 having the cylindrical surface 118, the receiving bore 86, contact surfaces 94, end surfaces 95, the wire passageway 106, and a wire-receiving recess 90; installing the communication coil assembly 150 in the receiving bore 86; passing the lead wires 156 and 160 out of the receiving bore 86, through the wire passageway 106 and into the wire-receiving recess 90; and potting the communication coil assembly 150 in the receiving bore 86 with potting compound 135.

Referring again to FIG. 2b, in operation, the cable assembly 10 connects to a data recording unit (not shown) on board the boat 12 (shown in FIG. 1). The cable assembly 10 unwinds from a spool (not shown) on the boat 12, and lowers into the water. An operator sends a control signal through the cable 16 to the communication coil assemblies 150 (shown in FIG. 6). The communication coils 14 of the communication coil assemblies 150 communicate with the unit 105 in the cable-leveler 15 via magnetic induction signals. Due to the angular offset of each communication coil 14 with respect to the adjacent communication coil, at least one of the communication coils 14 has an communication path with the unit 105 which is unobstructed by the shielding of the cable 16. The communication coils 14 thus are able to activate a mechanism (not shown) in the cable-leveler 15, in a manner known in the art, to raise or lower the cable assembly 10 to a desired depth in the water.

An advantage is that a communication coil assembly 150 is provided which ensures a communication path with the unit 105 in the cable-leveler 15 which is unobstructed by the shielding of the cable 16 at the center of the cable assembly 10.

Figure 8:
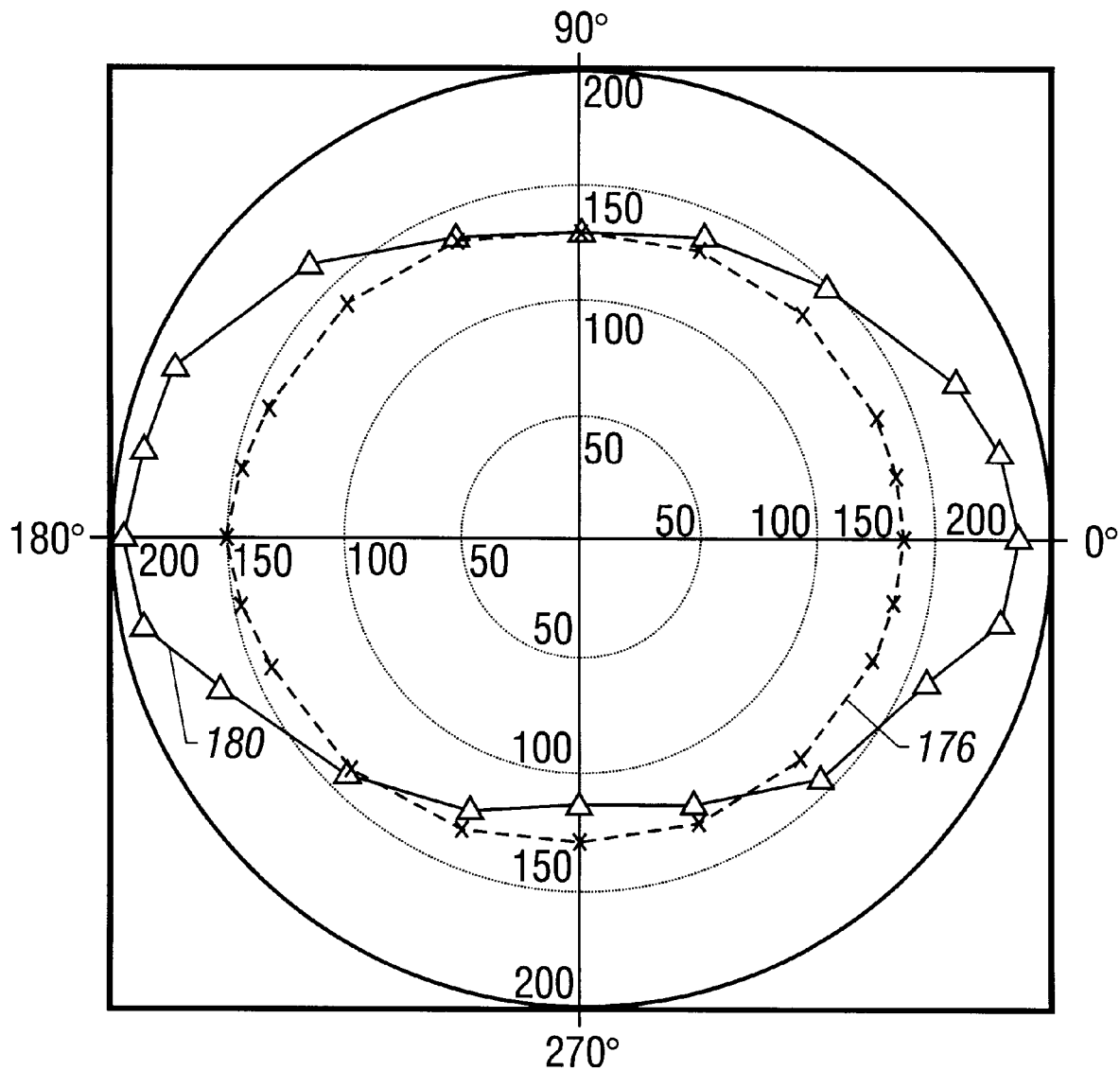
FIG. 8 is a graph of the field strength of the communication coil housing of the preferred embodiment as the cable rotates within a collar of the external device.

Another advantage of the present invention, as confirmed by the graph of FIG. 8, is that the field strength of the communication coil arrangement of the preferred embodiment is greater than that of prior art kerosene-filled cables. The prior art communication coil arrangement utilizes a single TR-990 coil assembly available from Syntron, Inc. of Houston, Tex. Applying root-mean-squares, a test conductor measured the induction field strength as he rotated the cable-leveler 15 through 360° around the cable to determine the variation in the field strength. The centerline of a coil in the cable leveler 15 was parallel to and radially displaced about 1.032 inches from the exterior surface of the cable assembly 10. The test conductor measured the potential in millivolts (mv). The result of these measurements is indicated by broken line 176. The line 176 is circular and varies from a potential of about 135 mv to about 150 mv. In the communication coil arrangement of the preferred embodiment, the two communication coils 14 are each smaller than the single coil of the prior art, and, together, the two coils consume the same amount of power as the single prior art coil. Each communication coil 14 was offset 180° from the adjacent communication coil, and located at the same depth below the surface of the cable assembly 10. The test conductor measured the induction field strength of the preferred embodiment, and found that the field strength varied from about 120 mv over about 60° of the circumference to almost 200 mv. The results of these measurements, depicted by solid line 180, indicate that the coil arrangement of the preferred embodiment substantially increases the inductive field strength over the prior art.

Another advantage is that the protective jacket 28 is continuous along the length of the cable assembly 10, thus making the cable assembly streamlined. This minimizes noise by minimizing uneven surfaces which disrupt laminar flow around the cable assembly 10.

Another advantage is that the cable assembly 10 is buoyant even when the protective jacket 28 ruptures.

Another advantage is that the cable assembly 10 is durable, and requires little maintenance.

Another advantage is that the cable assembly 10 requires minimum change-over time to accommodate different marine environments because the buoyancy of the solid-filled cable is less affected by water temperature, as compared to a fluid-filled cable.

Another advantage is that the cable assembly 10 provides for placement of the communication coil 14 near the external surface of the cable assembly, thus improving reception and minimizing noise which relative motion of components within the cable assembly generates.

In another alternate embodiment, the buoyant filler 24 fastens around the cable 16 with a mechanical fastener (not shown).

Although an illustrative embodiment of the invention has been shown and described, other modifications, changes and substitutions are intended in the foregoing disclosure. Accordingly, it is appropriate that the appended claims be construed broadly and consistent with the scope of the invention.

What is claimed is:

1. A solid marine seismic cable assembly comprising:

a. a cable having a central axis; and
   b. a communication coil housing which clamps around the cable, the housing containing communication coils adapted for communicating with an external device, wherein two of the communication coils, whether or not adjacent to one another, are offset at least 90° from each other about the axis of the cable.

2. The solid marine seismic cable assembly of claim 1, wherein the communication coil housing further includes a first portion and a second portion, each portion having a receiving bore which receives one of the communication coils.

3. The cable assembly of claim 2, wherein the first and second portions each include a wire-clearance recess and a wire passageway which connects the receiving bore and the wire-clearance recess.

4. The cable assembly of claim 2, wherein the receiving bore is an elongated cylindrical bore, and wherein each communication coil is potted with potting compound which fills substantially all the space in the receiving bore not occupied by the communication coil.

5. The cable assembly of claim 2, wherein an insolation grommet fills a gap along a portion of a length of the communication coil, between the interior surface of the receiving bore and an outer cylindrical surface of the communication coil, thus supporting the communication coil within the receiving bore.

6. The cable assembly of claim 1, wherein each communication coil includes two lead wires, one of the lead wires electrically connecting to a first end of a resistor and a first end of a capacitor, the other of the lead wires electrically connecting to a second end of the resistor, the second end of the resistor and a second end of the capacitor each electrically connecting to a respective signal-transmitting wire in the cable.

7. The cable assembly of claim 6, wherein the communication coil comprises a ferrite rod wound with insulated copper wire, the copper wire having ends which comprise the two lead wires.

8. The cable assembly of claim 1, wherein the cable includes:

a. a load-bearing fiber bundle, b. signal-transmitting wires; and c. power conductors.

9. The cable assembly of claim 8, wherein a buoyant filler surrounds the cable and separates multiple communication coil housings, and wherein an outer protective jacket surrounds the communication coil housings and the buoyant filler.

10. The cable assembly of claim 1, wherein external devices affix to the cable assembly in a spaced-apart relationship corresponding to the spaced-apart relationship of the communication coil housings, each external device having a unit which communicates with the communication coils via magnetic induction signals.

11. The cable assembly of claim 9, wherein the buoyant filler substantially fills regions being bounded by an outermost cylindrical surface of the cable and an imaginary cylindrical surface which extends between outermost cylindrical surfaces of adjacent communication coil housings.

12. The cable assembly of claim 9, wherein the buoyant filler is a split tube which comprises a composite mixture of thermoplastic elastomer and glass microspheres, the composite mixture having a specific gravity of from 0.76 to 0.82.

13. The cable assembly of claim 9, wherein the protective jacket is a composite jacket comprising an internal layer of polyurethane and an external layer of polyvinyl chloride.

14. The cable assembly of claim 8, wherein the load-bearing fiber bundle comprises a thin cover enclosing a counter-helix-wrapped high-strength fiber.

15. A method of making a solid marine seismic cable assembly having a cable and a communication coil housing, the method comprising the steps of:

a. surrounding a load-bearing fiber bundle with signal-transmitting wires;

b. enclosing the load-bearing fiber bundle and the signal-transmitting wires with a protective sheath; and c. via a splice, electrically connecting a communication coil in the communication coil housing to signal-transmitting wires in the cable, and clamping the communication coil housing to the cable.

16. The method of claim 15, wherein, after the step of connecting and clamping, the method comprises the following additional steps:

a. installing a buoyant filler around the cable between the communication coil housings; and b. enclosing the cable, the communication coil housings, and the buoyant filler in a protective jacket.

17. The method of claims 15 or 16, wherein the communication coil comprises a ferrite rod wound with insulated copper wire.

18. A communication coil housing for use with a solid marine seismic cable assembly, the communication coil housing comprising a first portion and a second portion, wherein the first and second portions have receiving bores which each receive a communication coil, the first and the second portions are adapted for clamping together around a solid marine seismic cable assembly, and the portions further include a wire-clearance recess and a wire passageway which connects the receiving bore and the wire-clearance recess.

* * * * *